United States Patent
Pettis et al.

(10) Patent No.: US 10,138,024 B2
(45) Date of Patent: Nov. 27, 2018

(54) FLEXIBLE LAMINATE STRUCTURE WITH INTEGRATED ONE-WAY VALVE

(71) Applicant: Sonoco Development, Inc., Hartsville, SC (US)

(72) Inventors: Rod Pettis, Elgin, SC (US); Bob Puechl, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 97 days.

(21) Appl. No.: 14/717,661

(22) Filed: May 20, 2015

(65) Prior Publication Data
US 2016/0340085 A1 Nov. 24, 2016

(51) Int. Cl.
| | |
|---|---|
| *B65D 30/24* | (2006.01) |
| *B32B 7/00* | (2006.01) |
| *B32B 7/12* | (2006.01) |
| *B32B 27/00* | (2006.01) |
| *B32B 27/06* | (2006.01) |

(Continued)

(52) U.S. Cl.
CPC ............ *B65D 31/14* (2013.01); *B32B 3/00* (2013.01); *B32B 3/26* (2013.01); *B32B 7/00* (2013.01);
(Continued)

(58) Field of Classification Search
CPC ...... B65D 31/14; B65D 31/147; B65D 33/01; B65D 77/225; B65D 90/34; Y10T 137/4358; Y10T 137/4666; Y10T 137/4643; Y10T 137/4456; Y10T 137/7888; F16K 13/10; F16K 17/192
(Continued)

(56) References Cited

U.S. PATENT DOCUMENTS 2,778,173 A * 1/1957 Taunton .................. B65D 33/01
  206/524.8
4,134,535 A   1/1979 Barthels et al.
(Continued)

FOREIGN PATENT DOCUMENTS

| EP | 2 272 661 A1 | 1/2011 |
| WO | WO 2010/013220 A1 | 2/2010 |

OTHER PUBLICATIONS

Extended European Search Report from corresponding European Patent Application No. 16170327.7 dated Sep. 23, 2016.
(Continued)

*Primary Examiner* — Michael R Reid
(74) *Attorney, Agent, or Firm* — Nelson Mullins Riley & Scarborough LLP

(57) ABSTRACT

A flexible laminate for a package is described that includes an integrated one-way valve that allows gas generated within the package (e.g., carbon dioxide outgas) to be released to the external environment, while at the same time preventing environmental elements from entering the package. The valve is defined by the layers that form the flexible laminate, as opposed to being a separate structure that is attached to the flexible laminate. In particular, first and second cut lines are defined in a valve area of the first and second film layers of the flexible laminate structure in an offset manner. Oil is pattern-applied to one or both film layers in the valve area, and an opposing surface of one or both of the film layers further includes a surface treatment that decreases the amount of surface energy between the film layers to allow the valve to open at the desired pressure.

24 Claims, 2 Drawing Sheets

(51) Int. Cl.
   *B32B 27/32* (2006.01)
   *B32B 27/36* (2006.01)
   *B32B 3/00* (2006.01)
   *B32B 3/26* (2006.01)
   *B65D 33/01* (2006.01)
   *B65D 77/22* (2006.01)

(52) U.S. Cl.
   CPC ............... *B32B 7/12* (2013.01); *B32B 27/00* (2013.01); *B32B 27/06* (2013.01); *B32B 27/32* (2013.01); *B32B 27/36* (2013.01); *B65D 33/01* (2013.01); *B65D 77/225* (2013.01); *B32B 2307/50* (2013.01); *B32B 2307/514* (2013.01); *B32B 2307/546* (2013.01); *B32B 2439/46* (2013.01); *B32B 2439/70* (2013.01)

(58) Field of Classification Search
   USPC .... 137/246, 254, 251.1, 247, 852; 220/89.1, 220/203.03; 383/100–103
   See application file for complete search history.

(56) References Cited

U.S. PATENT DOCUMENTS

| | | |
|---|---|---|
| 4,206,870 A | 6/1980 | DeVries |
| 5,553,942 A | 9/1996 | Domke et al. |
| 5,860,441 A * | 1/1999 | Garcia ................... A63H 27/10 137/15.18 |
| 6,182,850 B1 | 2/2001 | Marbler et al. |
| 6,733,803 B1 | 5/2004 | Vidhjaer |
| 7,490,623 B2 | 2/2009 | Rypstra |
| 7,874,731 B2 | 1/2011 | Turvey et al. |
| 7,892,390 B2 * | 2/2011 | Zeik .......................... B32B 3/06 156/145 |
| 8,152,016 B2 * | 4/2012 | Berndt ................ B01L 3/50853 220/229 |
| 8,197,138 B2 | 6/2012 | Turvey |
| 8,197,139 B2 | 6/2012 | Turvey et al. |
| 8,557,357 B2 * | 10/2013 | Lykke ...................... B32B 3/08 428/137 |
| 2009/0190861 A1 | 7/2009 | Turvey et al. |
| 2012/0177307 A1* | 7/2012 | Duan ................. B65D 75/5833 383/211 |
| 2012/0224792 A1 | 9/2012 | Turvey et al. |
| 2013/0284738 A1 | 10/2013 | Haimi |
| 2016/0185501 A1 | 6/2016 | Hansen |

OTHER PUBLICATIONS

Office Action from Canadian Patent Application No. 2,930,650, dated Mar. 21, 2017, 4 pages.

\* cited by examiner

FLEXIBLE LAMINATE STRUCTURE WITH INTEGRATED ONE-WAY VALVE

BACKGROUND

This invention relates to flexible laminate structures for forming flexible packages and containers. In particular, embodiments of the invention describe a flexible laminate structure that includes a one-way valve feature that is integral to the laminate structure and that is configured to allow gas to vent from within the package.

Packages can be used to store various types of products. In some cases, for example, a flexible laminate structure can be used to form a package, such as a bag or a pouch, for holding a product that may, over time, generate gas (e.g., outgas). For example, freshly roasted coffee may have a tendency to outgas carbon dioxide. Other products may also undergo a reaction over time within the package that results in the generation of gas.

At the same time, the products stored in the package may need to be isolated and protected from the ingress of oxygen and/or moisture to promote freshness and shelf-life and to maintain the quality of the contents for as long as possible.

BRIEF SUMMARY

Embodiments of the invention described herein provide improved packages for storing products and associated methods for forming such packages, where the packages are designed to allow gas generated within the package to escape to the external environment (e.g., to minimize or prevent ballooning or other distortions of the package that may be caused by increasing gas pressure within the package) while at the same time minimizing the amount of oxygen and/or moisture that is allowed to enter the package.

In some embodiments, for example, a flexible laminate structure for a package is provided that includes an integrated one-way valve feature. The flexible laminate structure comprises a first film layer and a second film layer laminated to the first film layer via a permanent adhesive that is pattern-applied to at least one of the first or second film layers. The first film layer includes a first cut line and the second film layer includes a second cut line offset from the first cut line. A valve area is defined in the laminate, where the valve area includes the first and second cut lines and is devoid of the permanent adhesive. In addition, the valve area comprises a viscous medium, such as oil, that is pattern-applied to at least one of the first or second film layers and is disposed between the first and second film layers so as to occupy at least a portion of the valve area. An opposing surface of at least one of the first or second film layers further includes a surface treatment configured to decrease an amount of surface energy between the first and second film layers in the valve area.

In some cases, the surface treatment may comprise at least one of a printed ink, a coating, or a texture. The surface treatment of the first or second film layers may be located only in the valve area. Additionally or alternatively, at least one of the first or second film layers may comprise two or more sub-layers. For example, one of the first or second film layers may comprise polyethylene terapthalate (PET) and/or oriented polypropylene (OPP).

In other embodiments, a method of manufacturing a flexible laminate structure for a package is provided that includes an integrated one-way valve feature. The method may include laminating a first film layer to a second film layer via a pattern-printed permanent adhesive that is applied to at least one of the first or second film layers; defining a first cut line in the first film layer; and defining a second cut line in the second film layer, where the first and second cut lines are offset with respect to each other. In addition, the method may include leaving an area of the laminate devoid of the permanent adhesive so as to define a valve area, the valve area including the first and second cut lines. Moreover, a viscous medium, such as oil, may be pattern-applied to at least one of the first or second film layers in the area of the laminate devoid of the permanent adhesive, and a surface treatment may be effected with respect to at least one of the first or second film layers, where the surface treatment is configured to decrease an amount of surface energy between the first and second film layers in the valve area.

The step of effecting a surface treatment with respect to at least one of the first or second film layers may comprise using at least one of a printed ink, a coating, or a texture. In some cases, effecting a surface treatment with respect to at least one of the first or second film layers may include effecting the surface treatment with respect to at least one of the first or second film layers only in the valve area.

At least one of the first or second film layers may comprise two or more sub-layers. For example, one of the first or second film layers may comprise polyethylene terapthalate (PET). Additionally or alternatively, one of the first or second film layers may comprise oriented polypropylene (OPP).

In some cases, at least one of the steps of defining a first cut line in the first film layer or defining a second cut line in the second film layer may comprise defining the cut line using a laser. Moreover, at least one of the steps of defining a first cut line in the first film layer or defining a second cut line in the second film layer may comprise defining the cut line using mechanical scoring.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

Figure 1:
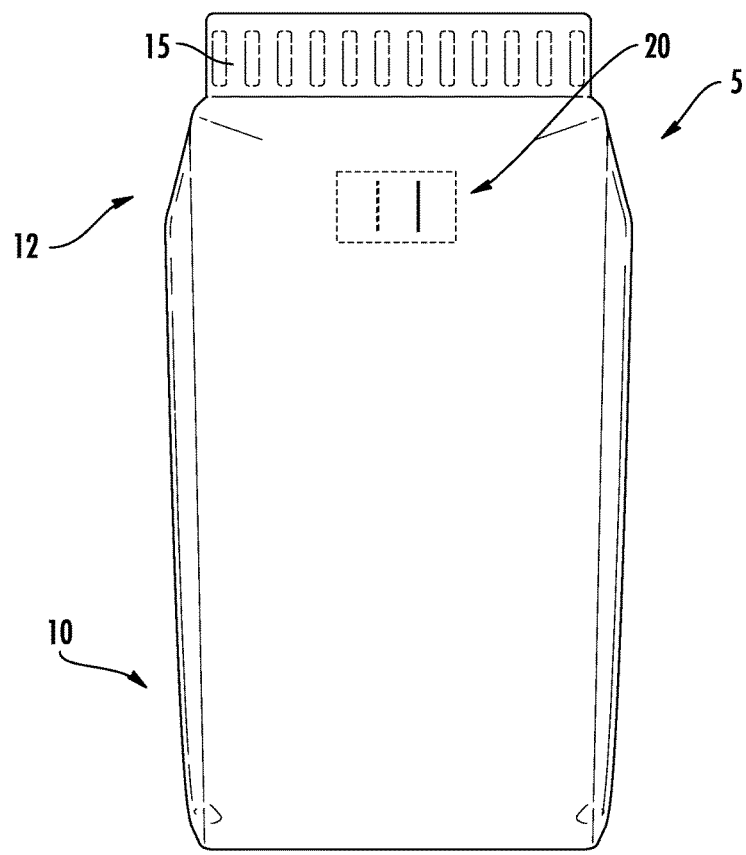
FIG. 1 is a perspective view of a package having an integrated valve according to an example embodiment.

The present invention now will be described more fully hereinafter with reference to the accompanying drawings in which some but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Packages can be used to hold a variety of products, including food products and other products that may undergo a reaction over time that generates gas. As an example, fresh roasted coffee has a tendency to outgas (generate carbon dioxide). Other products may release gas over time, as the product ages or is exposed to even minimal levels of oxygen or moisture as may enter the sealed package.

When such products are stored in a sealed container, there is a danger that the gas produced inside the package will build up. As a result, the package can become inflated and bulge outwardly, which may be unsightly and/or deter a customer from purchasing the package. Furthermore, as more and more gas accumulates within the package, the pressure inside the package may rise to the level of bursting the package or affecting one or more of the seals of the package (e.g., before a consumer wishes to open the package).

At the same time, maintaining a good seal on the package is important to protect the contents of the package from the external environment, such as to prevent the ingress of atmospheric gas (e.g., oxygen and water vapor). The goals of allowing gas to escape from the package while at the same time also preventing the unwanted ingress of gas/water vapor into the package are, thus, seemingly diametrically opposed.

Conventional solutions for venting gas produced within an enclosed package include the use of button valves or pressure sensitive valves that are formed separately from the package and are affixed to the package at the time the package is filled. Such solutions, however, are expensive to implement and add complexity to the filling operation to accommodate application of the valves to the packages.

Accordingly, embodiments of the present invention provide a flexible laminate structure for a package that includes an integrated one-way valve feature configured to allow gas generated within the package (e.g., carbon dioxide outgas) to be released to the external environment, while at the same time maintaining the integrity of the package contents by preventing environmental elements from entering the package. Because the valve is integral to the flexible laminate structure (e.g., defined by the layers that form the flexible laminate, as opposed to being a separate structure that is adhered to or otherwise combined with the flexible laminate), the cost of forming a separate valve and modifying the flexible laminate to accommodate attachment of the valve to the package is avoided, thereby reducing the overall cost and complexity of manufacturing and/or filling a package with a one-way valve. Moreover, as the valve is integrated with the flexible laminate, seams and/or attachment locations of the package can be minimized or eliminated, thereby also reducing the potential for leaks.

With reference to FIG. 1, for example, a package 5 (e.g., a gusseted bag, pouch, or other flexible package) is shown that is designed to hold a product that is prone to off-gassing, such as freshly roasted coffee. The package 5 may have a first end 10, upon which the package might rest when placed on a surface, and a second end 12 opposite the first end. In some cases, the product contained within the package 5 may only occupy a portion of the volume of the package, such that part of the inner volume of the package closest to the second end 12 may be empty. The first end 10 of the package 5 may be gusseted to accommodate a greater volume of product within the package and/or to provide a more stable base on which the package can rest. The second end 12 of the package 5 may, in some cases, include a seal 15, such as a heat seal that is applied to maintain the package contents inside the package and prevent atmospheric gas from entering the package prior to opening of the package.

In some embodiments, the flexible laminate that forms the package 5 defines a valve area 20. For example, the valve area 20 may be disposed proximate the second end 12 of the package 5, such as in the empty region of the package. In this way, the risk that the package contents will interfere with the operation of the valve 20 can be minimized.

Figure 2:
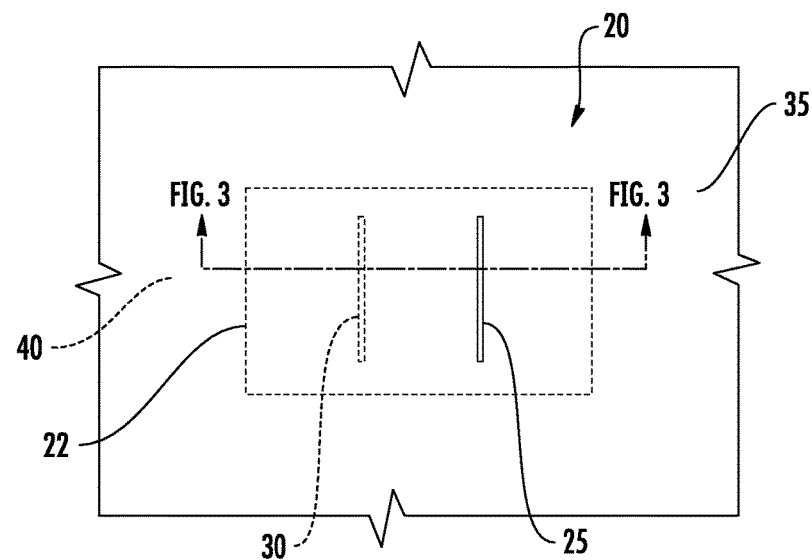
FIG. 2 is a close-up view of the integrated valve of the package of FIG. 1 according to an example embodiment.

FIG. 2 shows a close-up view of the valve area 20 of the package 5. The valve area 20 may, in this regard, be defined to include a first cut line 25 defined in a first film layer 35 of the laminate and a second cut line 30 defined in a second film layer 40 of the laminate. In the view shown in FIG. 2, for example, the first film layer 35 forms the outer layer of the flexible laminate forming the package 5, whereas the second film layer 40 forms an inner layer of the flexible laminate and is thus underneath the first film layer.

Accordingly, the flexible laminate structure may comprise a first film layer 35 and a second film layer 40. The second film layer 40 may be laminated to the first film layer via a permanent adhesive 50 (shown in FIGS. 3 and 4) that is pattern-applied to at least one of the first or second film layers. The first film layer 35 may thus include the first cut line 25, and the second film layer 40 may include the second cut line 30, which is offset from the first cut line 25 (e.g., is not aligned with the first cut line, but rather is spaced from the first cut line).

Figure 3:
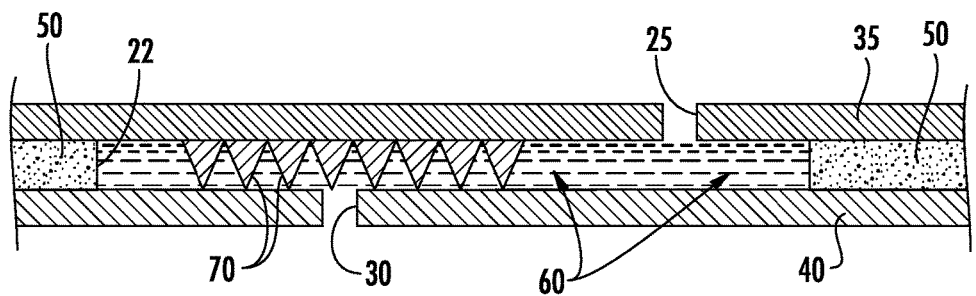
FIG. 3 is a schematic cross-sectional view of a flexible laminate structure with an integrated valve in a closed configuration according to an example embodiment.
Figure 4:
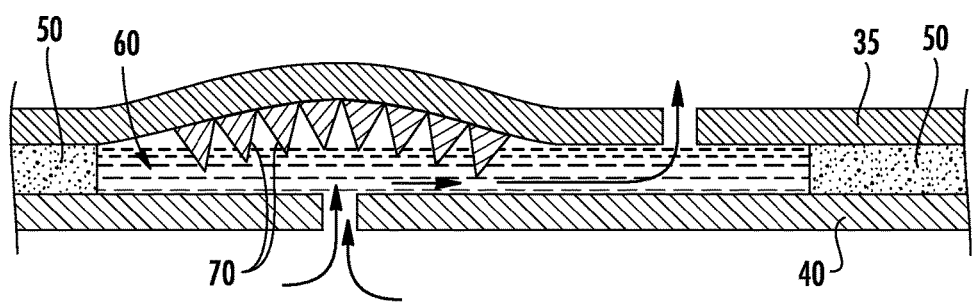
FIG. 4 is a schematic cross-sectional view of the flexible laminate structure of FIG. 3 with the integrated valve in an open configuration according to an example embodiment.

A cross-section of the valve area 20 is shown in FIG. 3 in a closed position and in FIG. 4 in an open position. With reference to FIGS. 3 and 4, the valve area 20 includes the first and second cut lines 25, 30, such that the first and second cut lines are contained within a perimeter 22 of the valve area 20 (shown in FIG. 2). The valve area 20 may, for example be an area of the flexible laminate that is devoid of the permanent adhesive 50 adhering the first and second film layers 35, 40 to each other. In this way, the perimeter 22 of the valve area 20 may be the interface between an area including permanent adhesive 50 and an area devoid of permanent adhesive.

The valve area 20 may comprise a viscous medium, such as oil 60, that is pattern-applied to at least one of the first or second film layers 35, 40 and is disposed between the first and second film layers so as to occupy at least a portion of the valve area. The oil 60 may, for example, be silicone oil in some cases. The presence of the oil 60 may encourage the opposing surfaces of the first and second film layers 35, 40 (e.g., the surface of each film layer that is adjacent to or most proximate the other film layer) to maintain contact with each other (with the oil disposed therebetween) by virtue of the viscosity and/or surface tension of the oil, such that the integrated valve is biased towards the closed position shown in FIG. 3 when the pressure inside the package is below a certain threshold pressure. For example, in some embodiments, the volume of oil 60 disposed between the first and second film layers 35, 40 is selected such that the valve opens when the pressure inside the package just exceeds the atmospheric pressure outside the package. An example of a desirable range of pressures inside the package for moving the first layer 35 towards the open position shown in FIG. 4 is approximately 0.1 psi to approximately 0.8 psi.

In addition, when the atmospheric pressure outside the package is still slightly above the pressure inside the package, the valve should be configured to move from the open position to the closed position shown in FIG. 3 so as to seal and prevent gas and/or moisture from entering the package. In some embodiments, the valve is configured such that a desirable range of atmospheric pressures outside the package for moving the first layer 35 towards the closed position shown in FIG. 3 is approximately 0.05 psi to approximately 0.5 psi, but in any case is less than the pressure required inside the package to open the valve.

Moreover, in some embodiments, an opposing surface of at least one of the first or second film layers 35, 40 may further include a surface treatment configured to decrease an amount of surface energy between the first and second film layers in the valve area. The surface energy may be characterized as the amount of energy required to adhere the opposing surfaces of the first and second film layers 35, 40 to each other. Thus, while the addition of the oil 60 in the valve area 20 between the opposing surfaces of the first and second film layers 35, 40 serves to increase the surface energy of the interface between the opposing film surfaces, the resulting surface energy may be too great to allow the valve to open (FIG. 4) at the desired pressure level of the package interior. The inclusion of the surface treatment for at least one of the opposing surfaces of the first and second film layers 35, 40, however, may counteract the increased adhesion force imparted by the oil 60, thereby reducing the surface energy to a level that allows the valve to be moved from the closed configuration shown in FIG. 3 to the open configuration shown in FIG. 4 when a desired level of pressure is achieved within the package.

In some embodiments, for example, the surface treatment may comprise at least one of a printed ink, a coating, or a texture that is applied to one or both of the opposing surfaces of the first and second film layers 35, 40. The surface treatment (e.g., the printed ink, coating, or texture) may serve to create bumps or ridges 70 that extend from the surface of the respective film layer 35, 40 that is treated toward the opposing surface of the other film layer. In the depicted example of FIGS. 3 and 4, for example, the surface treatment has been applied to the opposing surface of the first film layer 35, such that the ridges 70 extend from the first film layer towards the second film layer 40.

Accordingly, the surface energy of the interface between the first and second film layers 35, 40 may be decreased due to the reduced contact area between the two film layers. For example, instead of substantially the entire opposing surface of the first film layer 35 in the valve area contacting substantially the entire opposing surface of the second film layer 40 in the valve area, in which case the surface energy would be at a maximum, the ridges 70 created by the surface treatment in some embodiments may reduce the contact area to the sum of the areas over which each of the ridges contacts the corresponding locations of the opposing surface of the respective film layer. The inventors have found that the smaller the contact area, the less energy is required to separate the first and second film layers 35, 40, and the less internal package pressure is needed to move the valve from the closed configuration of FIG. 3 to the open configuration of FIG. 4. Accordingly, the type of surface treatment, the number of ridges 70 created, and/or the amount of inherent separation between the first and second film layers 35, 40 caused by the extension of the ridges 70 may be selected to achieve a desired surface energy that results in the opening of the valve at the desired package pressure. In addition, the pattern of the ridges 70 may be selected to further tune the opening and closure of the valve, depending on the requirements of the package. In some cases, the thickness of the surface treatment (e.g., thickness of the coating used), the roughness imparted by the surface treatment (e.g., based on the chemical makeup of the surface treatment), and the location of the surface treatment may also affect the resulting surface energy.

In the depicted embodiments of FIGS. 3 and 4, the surface treatment of the first or second film layers is located only in the valve area 20; however, in other embodiments, the surface treatment (e.g., the ridges 70) may extend outside the valve area 20. For example, in some cases, the surface treatment may extend along the entire film, or the surface treatment may be applied to an area that is larger than the valve area 20. In this way, alignment of the valve area with the location of the surface treatment during lamination of the film layers 35, 40 may be easier to achieve, such as during the manufacturing process.

The flexible laminate structure may include first and second film layers 35, 40 made of various different materials, depending on the particular application (e.g., depending on the type of product stored in the package). The first and/or second film layers 35, 40 may, for example, include a polymer. In some embodiments, for example, one of the first or second film layers 35, 40 may comprise polyethylene terephthalate (PET). In other embodiments, one of the first or second film layers 35, 40 may include oriented polypropylene (OPP). Other materials that may be used for the first or second film layers 35, 40 may include Polyethylene (PE), metal foil (e.g., aluminum), metallized oriented polypropylene (mOPP), metallized polyethylene terephthalate (mPET), and co-polymer polypropylene (CPP), to name a few. Accordingly, typical laminate structures may include, for example, PET/Foil/PE, PET/Foil/PET/PE, PET/mPET/PE, PET/mOPP/PE, OPP/mOPP/PE, PET/PE, OPP/PE, OPP/OPP, OPP, mOPP, PET/CPP, and PET/Foil/CPP.

Figure 5:
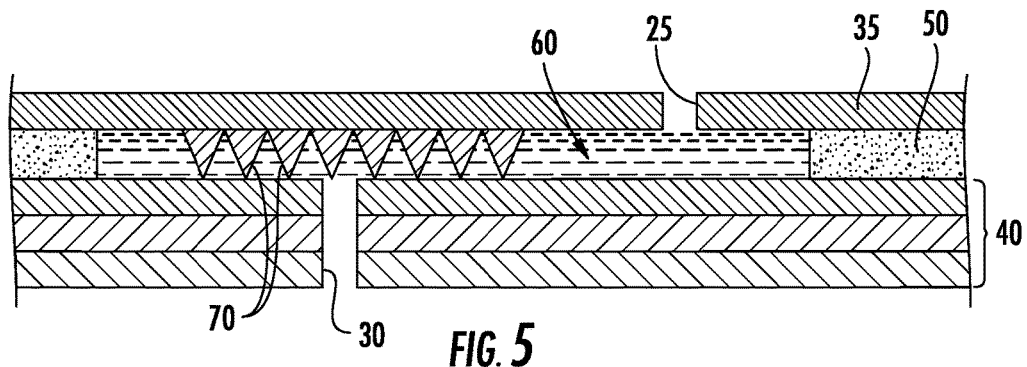
FIG. 5 is a schematic cross-sectional view of a flexible laminate structure having an integrated valve in which the second film is a 3-ply film, shown in the closed configuration, according to an example embodiment.

In this regard, in some cases, the flexible laminate structure described above may be made using a first or second film layer 35, 40 (or both) that includes two or more sub-layers, as shown in FIG. 5. One or both of the first and second film layers 35, 40 may, for example, be a 2-ply film, a 3-ply film, a 4-ply film, or include additional plies, depending on the particular application (e.g., depending on the type of product to be stored in the package), with some example structures as noted above. In FIG. 5, for example, a flexible laminate structure showing the integrated valve in a closed configuration is illustrated that has a single-ply first film layer 35 and a 3-ply second film layer 40. Sub-layers having different characteristics (e.g., different thicknesses, different materials, etc.) may be used in some cases to achieve certain oxygen and/or moisture transmission rates, so as to promote the freshness and/or shelf life of the product stored in the package. For example, the first film layer 35 may be a single-ply layer of PET, whereas the second film layer 40 may be a 3-ply film with sub-layers of foil/PET/PE.

Methods of manufacturing a flexible laminate structure for a package including an integrated one-way valve feature are also provided. According to embodiments of the methods, a first film layer may be laminated to a second film layer via a pattern-printed permanent adhesive that is applied to at least one of the first or second film layers, as described above. A first cut line may be defined in the first film layer, and a second cut line may be defined in the second film layer, where the first and second cut lines are offset with respect to each other. The cut lines may be defined in the flexible laminate after the first and second film layers have been laminated to each other, such as by using precision scoring techniques. In this way, the manufacture of the integrated valve is simplified as compared to conventional methods of providing a valve on packaging, in which a separately-formed valve must be attached to the flexible laminate at a predefined location.

In this regard, the first and/or second cut lines may be made in various ways, such as via a laser. As an alternative to the use of lasers for scoring the laminate, the cut lines can be formed in the laminate by mechanical scoring or cutting. For instance, a kiss roll and a backing roll may be used to form a nip through which the laminate is passed. The kiss roll may comprise a rotary cutting die defining a cutting edge that is configured to define the first and/or second cut lines.

As the first and second film layers are laminated to each other, an area of the laminate is left devoid of the permanent adhesive so as to define the valve area. As described above, the first and second cut lines are defined within the valve area, such that the valve area includes the first and second cut lines. In addition, oil may be pattern-applied to at least one of the first or second film layers in the area of the laminate devoid of the permanent adhesive. A surface treatment may be effected with respect to at least one of the first or second film layers, and the surface treatment may be configured to decrease an amount of surface energy between the first and second film layers in the valve area, as described above.

In some cases, effecting a surface treatment with respect to at least one of the first or second film layers may comprise using at least one of a printed ink, a coating, or a texture, such as to form ridges or bumps between opposing surfaces of the first and second film layers. The surface treatment may be effected with respect to at least one of the first or second film layers only in the valve area in some embodiments, whereas in other embodiments the surface treatment may extend outside of the valve area, such as in cases were the surface treatment is effected with respect to substantially the entire opposing surface of a respective film layer.

As described above, the first and second film layers may comprise different materials, such as PET, OPP, or other polymer materials, as well as non-polymer material such as aluminum foil. Moreover, at least one of the first or second film layers may comprise two or more sub-layers, such as in the example depicted in FIG. 5.

Many other modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A flexible laminate structure for a package including an integrated one-way valve feature, said flexible laminate structure comprising:
    an outer film layer;
    an inner film layer laminated to the outer film layer via a permanent adhesive that is pattern-applied to at least one of the outer or inner film layers, wherein the outer film layer includes a first cut line and the inner film layer includes a second cut line offset from the first cut line; and
    a valve area defined in the laminate, the valve area including the first and second cut lines and being devoid of the permanent adhesive, wherein the valve area comprises a viscous medium that is pattern-applied to at least one of the outer or inner film layers and is disposed between the outer and inner film layers so as to occupy at least a portion of the valve area,
    wherein a coating is applied to an inner surface of the outer film layer, such that the coating is disposed between the outer and inner film layers and wherein the coating is configured to decrease an amount of surface energy between the outer and inner film layers.

2. The flexible laminate structure of claim 1, wherein the coating is located only in the valve area.

3. The flexible laminate structure of claim 1, wherein at least one of the outer or inner film layers comprises two or more sub-layers.

4. The flexible laminate structure of claim 1, wherein one of the outer or inner film layers comprises polyethylene terephthalate (PET).

5. The flexible laminate structure of claim 1, wherein one of the outer or inner film layers comprises oriented polypropylene (OPP).

6. The flexible laminate structure of claim 1, wherein the viscous medium comprises oil.

7. The flexible laminate structure of claim 1, wherein the coating provides ridges that extend away from the surface of the outer film layer and toward the inner film layer.

8. The flexible laminate structure of claim 7, wherein the ridges reduce the contact area between the outer and inner film layers.

9. The flexible laminate structure of claim 1, wherein the coating is disposed in the area of the second cut line, but not in the area of the first cut line.

10. The flexible laminate structure of claim 1, wherein the coating is applied to both the outer film layer and the inner film layer, adjacent their opposing inner surfaces.

11. A method of manufacturing a flexible laminate structure for a package including an integrated one-way valve feature, said method comprising:
    laminating an outer film layer to an inner film layer via a pattern-printed permanent adhesive that is applied to at least one of the outer or inner film layers;
    defining a first cut line in the outer film layer;
    defining a second cut line in the inner film layer, wherein the first and second cut lines are offset with respect to each other;
    leaving an area of the laminate devoid of the permanent adhesive so as to define a valve area, the valve area including the first and second cut lines;
    pattern-applying a viscous medium to at least one of the outer or inner film layers in the area of the laminate devoid of the permanent adhesive; and
    applying a coating to an inner surface of the outer film layer, wherein the coating is configured to decrease an amount of surface energy between the outer and inner film layers in the valve area.

12. The method of manufacturing a flexible laminate structure of claim 11, wherein the step of applying a coating comprises applying the coating only in the valve area.

13. The method of manufacturing a flexible laminate structure of claim 11, wherein at least one of the outer or inner film layers comprises two or more sub-layers.

14. The method of manufacturing a flexible laminate structure of claim 11, wherein one of the outer or inner film layers comprises polyethylene terephthalate (PET).

15. The method of manufacturing a flexible laminate structure of claim 11, wherein one of the outer or inner film layers comprises oriented polypropylene (OPP).

16. The method of manufacturing a flexible laminate structure of claim 11, wherein at least one of the steps of defining a first cut line in the outer film layer or defining a second cut line in the inner film layer comprises defining the cut line using a laser.

17. The method of manufacturing a flexible laminate structure of claim 11, wherein at least one of the steps of defining a first cut line in the outer film layer or defining a second cut line in the inner film layer comprises defining the cut line using mechanical scoring.

18. The method of manufacturing a flexible laminate structure of claim 11, wherein the step of pattern-applying a viscous medium comprises pattern-applying oil.

19. The method of claim 11, wherein the coating provides ridges that extend away from the surface of the outer film layer and toward the inner film layer.

20. The method of claim 11, wherein the coating is applied in the area of the second cut line, but not in the area of the first cut line.

21. A flexible laminate structure for a package including an integrated one-way valve feature, said flexible laminate structure comprising:
an outer film layer;
an inner film layer laminated to the first film layer via a permanent adhesive that is pattern-applied to at least one of the outer or inner film layers, wherein the outer film layer includes a first cut line and the inner film layer includes a second cut line offset from the first cut line; and
a valve area defined in the laminate, the valve area including the outer and inner cut lines and being devoid of the permanent adhesive, wherein the valve area comprises a viscous medium that is pattern-applied to at least one of the outer or inner film layers and is disposed between the outer and inner film layers so as to occupy at least a portion of the valve area,
wherein a printed ink is applied to an inner surface of the outer film layer, and wherein the printed ink provides ridges that extend away from the surface of the outer film layer and toward the inner film layer.

22. The flexible laminate structure of claim 21, wherein the ridges created by the printed ink reduce the contact area between the outer and inner film layers.

23. The flexible laminate structure of claim 21, wherein the printed ink is located only in the valve area.

24. The flexible laminate structure of claim 23, wherein the printed ink is located in the area of the second cut line, but not in the area of the first cut line.

* * * * *